(No Model.)
B. W. PUNCHES.
SPRING FISH HOOK.
No. 575,405. Patented Jan. 19, 1897.
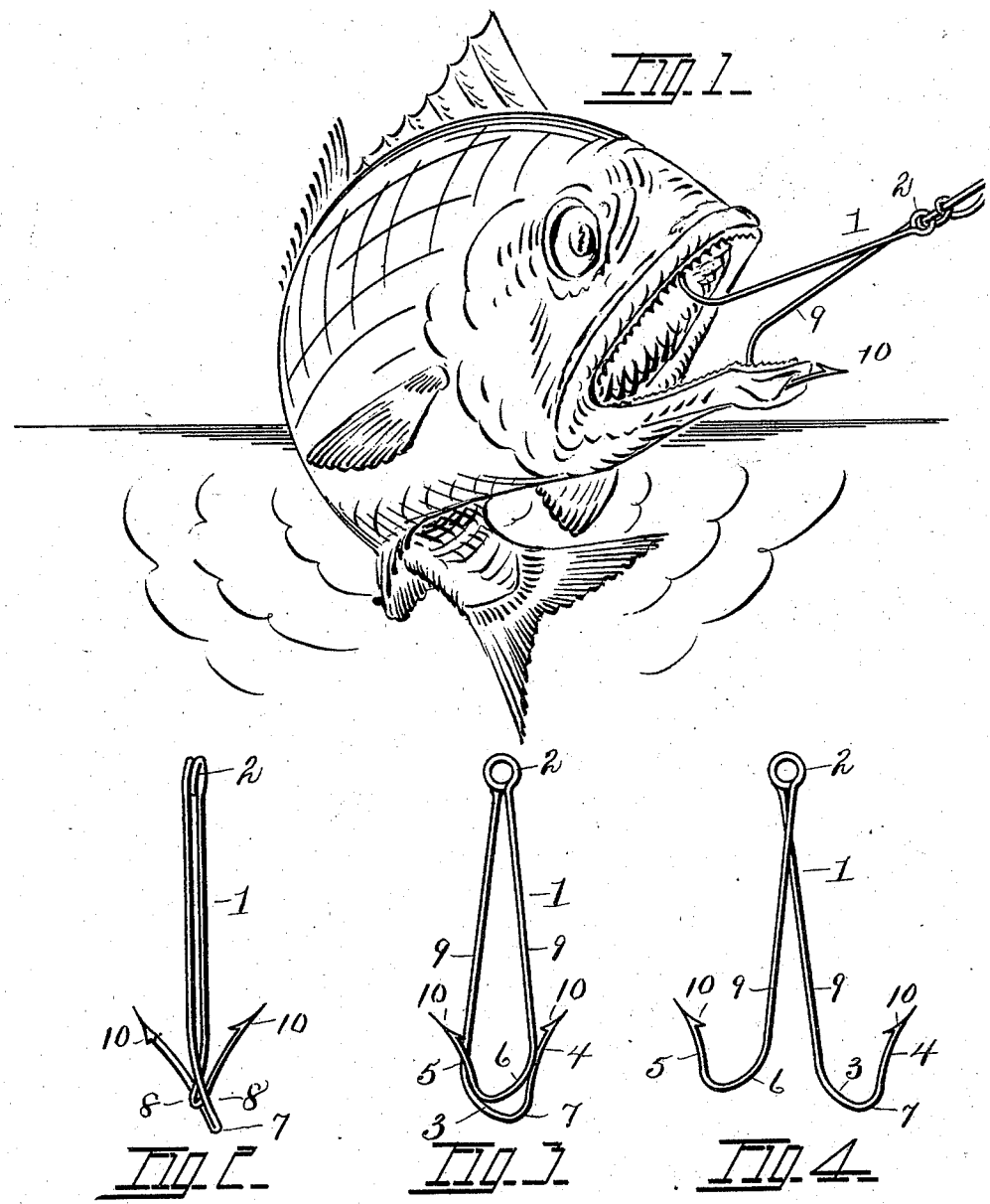

UNITED STATES PATENT OFFICE.

BERT W. PUNCHES, OF TOLEDO, OHIO.

SPRING FISH-HOOK.

SPECIFICATION forming part of Letters Patent No. 575,405, dated January 19, 1897.

Application filed March 13, 1896. Serial No. 583,114. (No model.)

*To all whom it may concern:*

Be it known that I, BERT W. PUNCHES, of Toledo, county of Lucas, and State of Ohio, have invented certain new and useful Improvements in Spring Fish-Hooks; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to a spring fish-hook, and has for its object to provide a duplex hook complete and entire in itself by being formed of a single piece of wire properly coiled for attachment to the line and to give a resilient expansive spring to the hooks formed upon the end of the wire.

A further object is to so arrange the bend of the hooks that they shall interlock one with the other and when interlocked form a loop for the reception of the bait in addition to that upon the barbs of the hooks.

In the drawings I have represented in Figure 1 a particular application of the operative result of springing the interlocked hooks in securing a fish thereon. Fig. 2 is a side elevation showing the hooks interlocked. Fig. 3 is a front elevation of the same, and Fig. 4 is a front elevation showing the hooks sprung.

In forming the hook the wire 1 is coiled at 2 slightly beyond the center of the same upon one side in order to allow of a curvature 3 of hook 4 to have a more extended bend than that of the hook 5, which is a like curvature 6 of a length to interlock with hook 4 and allow of a loop 7 extending below the curvature 6 of hook 5. The body portions of the hooks at the points 3 and 6, respectively, are bent at inverse angles, as shown at 8 8, Fig. 2, whereby when the hooks are sprung, as shown in Fig. 4, the act of interlocking the two hooks at the point of curvature 3 6 and also at the respective points of inverse bend 8 8 normally interlocks the same, as shown in Figs. 2 and 3.

With this description the operation is as follows: The hooks being interlocked and properly baited, the fish taking the bait of either hook and being attached thereto, in putting tension upon the gill of the fish or any of the solid portion thereof in passing down the curvature of either of the bends 3 6 and 8 8 will interpose a portion thereof between the curvature and the bend of the respective hook upon which the fish is caught and that of the body portions 9 9 of their companion hook and thereby separate the same when the resiliency of the spring-coil 2 will cause the free hook to catch into the fish.

It will be seen that the operation is entirely automatic and confined entirely to the separation of the two hooks by the gill or other portions of the fish caught upon the barb 10 of either hook and riding down the incline of the curvature and bend of the same.

It will also be noticed that the lower curvature 7 of the longer hook allows room for sustaining a minnow, the bait of like character for game fish, or when baiting the hooks with worms or bait of analogous character will allow a suspended portion of the same to direct fish more fully to either hook.

What I claim is—

A spring-hook formed of a single piece of wire with body portions of different lengths, each end of each body portion being bent inwardly toward each other to form hooks, and bent outwardly upon each side to form connecting portions, whereby the body portions may be interlocked by engagement with each other, due to the pressure exerted by the inherent spring of the wire and separated by the interposition of an object between the curvatures of the hooks.

In testimony that I claim the foregoing as my own I hereby affix my signature in presence of two witnesses.

BERT W. PUNCHES.

Witnesses:
PETER J. MENTZ,
WILLIAM WEBSTER.